Patented Aug. 9, 1927.

1,638,684

UNITED STATES PATENT OFFICE.

EMIL EDWIN, OF TRONDHJEM, NORWAY, ASSIGNOR TO AKTIESELSKAPET NORSK STAAL ELEKTRISK-GAS-REDUKTION, OF OSLO, NORWAY.

REDUCTION PROCESS USING CIRCULATING REDUCING GASES.

No Drawing. Application filed October 15, 1925, Serial No. 62,654, and in Norway September 27, 1922.

This invention relates to the carrying out of reduction processes by means of circulating reducing gases and has particularly for its purpose to utilize the reducing power of the gases to their full extent.

In the reduction of metal oxids by gases it is common to circulate the latter. The reducing gases are generated in a gas producer of convenient type and the reduction of the oxid material is mainly carried out by means of the carbon monoxid, and the hydrogen of the gases, which in the reduction process is transformed into carbon dioxid, and water vapor respectively. In the system of circulation the water vapor is commonly removed by condensation or absorption, while the carbon dioxid formed is reduced to monoxid, that is reused for reduction.

In spite of the very extensive work that has been spent on carrying out such gas reduction processes, particularly for the reduction of iron ores, these processes have hitherto only to a very limited extent come into practical use.

This remarkable fact is mainly due to two causes.

In the first place the reduction of the carbon dioxid is accompanied by an increase of volume, and it has therefore been necessary to remove from the circulation a quantity of gas corresponding to the increase of volume during regeneration. But as the industrial reduction furnaces only allow the use of a relatively small quantity of the reducing gases, the removed gas consisted still mainly of reducing constituents, which however in most cases could only be used for common heating purposes.

Another inconvenience met with in carrying out the gas reduction processes lies in the fact, that it is very difficult to effect reduction commercially by use of carbon monoxid alone and that favorable conditions are obtained only when a certain percentage of hydrogen is present in the gas. However the content of hydrogen in the reducing gases produced in the common way of gas generation is too low to have any marked effect in this respect.

A considerable percentage of hydrogen in the reducing gas will, quite apart from the prompter reduction of the ore, also offer great advantage in so far, as the reaction product of the hydrogen may easily be removed from the system as water vapor without eliminating reducing constituents.

According to my invention the said deficiencies in gas reduction processes are overcome and a high content of hydrogen in the circulating gas is obtained by removing part of the circulating gas from the system and subjecting it to catalytic treatment with steam whereby the reaction

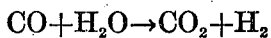

$$CO+H_2O \rightarrow CO_2+H_2$$

takes place. The content of carbon monoxid in the gas is in this way more or less, as it is desired, transformed into hydrogen and carbon dioxid. The latter constituent is subsequently removed totally or partially according to requirement whereupon the remaining gas is reintroduced into the circulation system.

As an example, my process may be carried out in the following manner: Through the reduction system is circulated a gas volume of, for instance, 3000 cubic meters per hour. A gas volume of 300 cubic meters per hour is withdrawn from the system and treated with steam in a contact apparatus. The steam is supplied in such quantities that at a temperature of 400° C. in the contact apparatus 90% of the carbon monoxid of the gas is transformed into carbon dioxid. After this treatment and after condensation of the excess of steam, the gas will consist of about 50% of hydrogen, about 45% of carbon dioxid and about 5% of carbon monoxid.

This gas is passed through an absorption tower standing under a pressure of, for instance, 10 atmospheres, and irrigated with water in counter-current to the gas. The major part of the carbon dioxid is taken up by the water and is removed with the latter. The remaining gas mixture, which, for instance, will contain about 90% of hydrogen, is re-introduced into the circulation system. Any furnace operator will modify the proportions to suit the particular conditions under which he is working.

Experience has shown that it is sufficient to treat only a rather small portion of the circulating gas continuously in this manner in order to have all the gaseous reaction products from reduction of the ore removed as carbon dioxid and water vapor.

The advantages of my process are obvious. In the first place I am able to raise the content of hydrogen in the circulating gases very materially at the cost of the carbon monoxid present without supply of energy, and at the same time a greater part of the reduction product may be removed by simple condensation. By the absorption of the carbon dioxid I furthermore attain the elimination of the oxygen of the carbon monoxid without removing reducing constituents from the circulation system. In this manner it is then possible to discard the total oxygen of the ore in the form of carbon dioxid and water vapor and to utilize quantitatively the reducing property of the reducing gases.

I claim:

1. In reduction processes using circulating reducing gases the steps which consist in withdrawing part of the circulating gases, subjecting said part of the gases to treatment with steam, whereby carbon monoxid is transformed into carbon dioxid and hydrogen, removing the carbon dioxid formed and reintroducing the remaining gas into the circulation system.

2. In reduction processes using circulating gases the steps which consist in withdrawing part of the circulating gases, subjecting said part of the gases to treatment with steam, whereby the carbon monoxid is partially transformed into carbon dioxid and hydrogen, removing the carbon dioxid formed and reintroducing the remaining gas into the circulation system.

3. In reduction processes using circulating reducing gases the steps which consist in withdrawing part of the circulating gases, subjecting said part of the gases to treatment with steam, whereby carbon monoxid is transformed into carbon dioxid and hydrogen, removing part of the carbon dioxid formed and reintroducing the remaining gas into the circulation system.

In testimony that I claim the foregoing as my invention I have signed my name.

EMIL EDWIN.